United States Patent [19]
Christiansen et al.

[11] Patent Number: 5,812,878
[45] Date of Patent: Sep. 22, 1998

[54] SYSTEM FOR DMA TRANSFER WHEREIN CONTROLLER WAITS BEFORE EXECUTION OF NEXT INSTRUCTION UNTIL A COUNTER COUNTS DOWN FROM A VALUE LOADED BY SAID CONTROLLER

[75] Inventors: Kevin M. Christiansen, Saratoga; Wesley S. Johnson, Tracy, both of Calif.

[73] Assignee: Apple Computer, Inc., Cupertino, Calif.

[21] Appl. No.: 645,960

[22] Filed: May 10, 1996

[51] Int. Cl.[6] .................................................. G06F 13/28
[52] U.S. Cl. ........................... 395/845; 395/842; 395/555
[58] Field of Search .................................. 395/560, 559, 395/881, 879, 287, 800, 842, 845, 555

[56] References Cited

U.S. PATENT DOCUMENTS

| | | | |
|---|---|---|---|
| 4,631,702 | 12/1986 | Korba | 395/560 |
| 5,448,717 | 9/1995 | Balmer | 395/559 |
| 5,491,814 | 2/1996 | Yee | 395/556 |
| 5,530,906 | 6/1996 | Cho | 395/881 |
| 5,555,559 | 9/1996 | Tsubota | 395/879 |
| 5,577,214 | 11/1996 | Bhattacharya | 395/287 |
| 5,617,576 | 4/1997 | Solari | 395/800 |

*Primary Examiner*—Thomas C. Lee
*Assistant Examiner*—Ki S. Kim
*Attorney, Agent, or Firm*—Burns, Doane, Swecker & Mathis, L.L.P.

[57] ABSTRACT

An apparatus for and method of controlling data transfers in which the data is in a predefined format. The DMA controller with a status register cooperates with a counter capable of effecting a change in the contents of the status register to generate predefined leading sequences of pulses. The arrangement may also include a module which can detect a predefined trailing sequence and effect a change in the contents of the status register.

15 Claims, 4 Drawing Sheets

| ChannelControl | 31:16 | 15:0 |
|---|---|---|
|  | mask | data |

FIG. 5(a)

| ChannelStatus | 31:16 | 15 | 14 | 13 | 12 | 11 | 10 |
|---|---|---|---|---|---|---|---|
|  | reserved | run | pause | flush | wake | dead | active |

FIG. 5(b)

| ChannelStatus | 9 | 8 | 7 | 6 | 5 | 4 | 3 | 2 | 1 | 0 |
|---|---|---|---|---|---|---|---|---|---|---|
|  | reserved | bt | s7 | s6 | s5 | s4 | s3 | s2 | s1 | s0 |

| 4 | 1 | 3 | 2 | 2 | 2 | 2 | 16 | |
|---|---|---|---|---|---|---|---|---|
| cmd | r | key | r | i | b | w | reqCount | |
| address ||||||||||
| cmdDep ||||||||||
| xferStatus | | | | | resCount | | | | |

FIG. 6

| 4 | 1 | 3 | 2 | 2 | 2 | 2 | 13 | 3 |
|---|---|---|---|---|---|---|---|---|
| cmd | r | key | r | i | r | w | reserved | reqCount |
| address |||||||||
| data32 |||||||||
| xferStatus | | | | | reserved | | | | |

FIG. 7

SYSTEM FOR DMA TRANSFER WHEREIN CONTROLLER WAITS BEFORE EXECUTION OF NEXT INSTRUCTION UNTIL A COUNTER COUNTS DOWN FROM A VALUE LOADED BY SAID CONTROLLER

FIELD

The present invention is in the field of controlling data transfers, and, in particular, coordinated data transfers where the data has a preset structure. In one particular aspect, the invention is in the field of using a Direct Memory Access (DMA) controller to control data transfers in a network.

BACKGROUND

To improve overall system performance, many computer systems incorporate devices capable of carrying out specialized functions independently of the main system processor. One such device is the DMA controller, which is generally capable of autonomously transferring blocks of data between main system memory and peripheral devices. In some implementations, the DMA controller may be controlled by one or more programs which the host processor sets up in memory.

For example, in the system shown in FIG. 1, an I/O controller 10 is connected to a system bus 20. The I/O controller 10 includes a system bus interface 30 and a DMA controller 40 connected to the system bus 20 through the system bus interface 30. The I/O controller 10 also includes a group of external device interfaces 50 connected to the system bus 20 through the system bus interface 30 and to the DMA controller 40. The arrangement of FIG. 1 has four external device interfaces but obviously the number is arbitrary and is determined by the requirements of a particular system.

The arrangement in FIG. 1 also includes a group of external device controllers 60 each corresponding to a respective one of the external device interfaces 50. Each external device controller 60 is also connected to a respective one of a group of external devices 70. In a given system, one of the external devices may be, for example, a speaker, in which case the associated external device interface 50 would be an audio interface, and the associated external device controller 60 would be a sound chip.

As mentioned above, ideally, the system processor would be able to effect a data transfer by storing the data to be transferred to some specified area in system memory, storing a DMA program at another area in the system memory, and initiating DMA controller activity. The system processor should then be free to execute other tasks without again having to intercede in that data transfer absent some unusual condition. This has not, however, always been feasible due the demands of particular types of data transfer.

An example of this has been in the use of a DMA controller to control data transfer over an Apple® LocalTalk® network. LocalTalk is Apple Computer Inc.'s local area network for connecting computers with each other and with shared resources, such as printers and file servers. Details concerning LocalTalk may be ascertained from U.S. Pat. Nos. 4,661,902 and 4,689,786, the disclosures of which are incorporated by reference. A computer is connected to LocalTalk by plugging a connector into a serial port (specifically, serial port "B") which communicates with a serial communications controller (SCC) through its channel B. The arrangement of FIG. 1 includes a LocalTalk connection, where the external device is a network 80, the external device controller is an SCC 90, and the external device interface is an SCC interface or I/O module 100.

Because multiple computers share the network, however, data transfer among them is not simply a matter of placing the data on the wire. Measures such as those described in the above-referenced patents must also be taken to prevent two or more devices on the network from trying to carry out incompatible operations at the same time. In particular, it is desirable to avoid data collisions in which two devices try to transmit at the same time.

In one method to avoid this, as described in the above patents, a device wishing to transmit a packet monitors the network line to determine if the line is idle or in use. If the line is in use, the device waits until an idle condition is sensed. Once an idle condition is sensed, then, as shown in FIG. 2, the device transmits a synchronization pulse, which may be any signal including a zero crossing. This is construed as a clock edge by the other devices on the network. The transmitting device then follows the synchronization pulse with an idle period of greater than two bit intervals. The other devices on the network construe this as a missing clock which signals that the line is in use.

The synchronization pulse may be obtained by momentarily enabling a transmit line driver for at least one bit interval if the data to be transmitted is encoded using a self-clocking technique such as FM-0 (Frequency Modulation 0) encoding. This is the encoding method used for LocalTalk networks in Macintosh® environments. FM-0 uses +V and −V voltage levels to represent bit values. Logical "1" bits are encoded alternately as +V and −V, depending on the previous voltage level. The voltage level remains constant over the entire bit interval for a "1" bit. Logical "0" bits are encoded as +V or −V, depending on the immediately preceding voltage level. The initial voltage value changes to the other value halfway through the bit interval. Thus, each bit cell, typically 4.3 $\mu$sec long, contains a state transition at its end. FM-0 self-clocking is used because the encoding for a bit can be used to determine the length of a bit interval and to synchronize the sender and receiver. Thus, if the transmit line driver is enabled for at least one bit interval, at least one transition is assured.

An arrangement capable of operation in this manner is shown in FIG. 3, where like components are designated with the like reference numbers. Basically, an RTS_ signal on a line marked "En" (for Enable) enables the transmit line driver 92 by going low for at least one bit interval to create a sync pulse. The RTS_ signal then goes high to disable the transmit line driver 92 for at least two bit intervals to create an idle period which is treated as a missing clock.

After the idle period, the transmitting device starts to transmit a frame. In one possible arrangement, data is transmitted using the High-Level Data Link Control (HDLC) protocol. HDLC is a bit-oriented protocol. The basic frame format is also shown in FIG. 2. Each frame begins with at least one 8 bit flag and ends with an 8 bit flag. The flags always have the same value, usually 01111110. Sandwiched between the flags is the data portion of the frame. This typically includes address field (ADDR) containing address data of the sender and the intended recipient, a control field (CTRL) which identifies the frame type, a variable-length information field (INFO) which contains the actual information being transmitted, and a frame check sequence (FCS).

Also, a synchronization field precedes the frame. The synchronization field consists of a first pulse at one value (+V or −V; +V in the example) which lasts 3 $\mu$sec followed immediately by a second pulse at the other value for 2 $\mu$sec. An Abort sequence AB such as a string of more than eleven 1's, follows the frame and signals the end of the packet.

As can be appreciated from the above, packet transmission involves the creation and detection of a number of ancillary signals. The main system processor therefore has had to remain involved DMA operations, turning off interrupts during the length of a packet, creating the transitions marking the start of a packet, reading and writing registers, looking for abort sequences, etc. Thus, many of the potential benefits of DMA are not fully realized in this circumstance.

To address this problem partially, it is possible to supply the SCC I/O module 100 with a module 120 (called an LTPC module) which can monitor a bit stream on the network for the Abort sequence, and, upon detecting the Abort sequence, disable the transmit line driver 92. Such an arrangement is shown in FIG. 3. The SCC I/O module 100 is provided with a one-bit read/write Start register for each transmit channel (A and B) memory mapped into the SCC IOM address space. (This register and the others described below as indicated are preferably part of the register 105.) The Start register is cleared on reset. When the system processor sets the Start register to "1", the LTPC module 120 begins to monitor the transmitted data looking for the Abort sequence. When the Abort sequence is detected, the RTS_ signal will be forced high, thereby disabling the line driver 92 and terminating the Abort sequence. The Start register must be set to "0" and then "1" again to re-arm it for the next packet.

The LTPC module 120 can force the RTS_ signal high to disable the driver 92 by gating an output signal to form a logical product with the RTS_ signal as originated in the SCC I/O module 100 using a gate 96 as shown in FIG. 3. Gating should occur according to the following truth table:

| RTS_ | LTPC | OUTPUT |
|------|------|--------|
| 0    | 0    | 0      |
| 1    | 0    | 1      |
| 0    | 1    | 1      |
| 1    | 1    | 1      |

The RTS_ signal is low to enable the driver 92 and goes high to disable the driver 92. When the signal from the LTPC module 120 is at one level (say, low), the RTS_ signal passes through the gate 96 unmodified. When the signal from the LTPC module 120 is the other level (say, high), however, the output is always high. This gating can be accomplished by any one of a number of elements in a manner apparent to one having ordinary skill in the art. For example, for the scheme shown above, the gating can be accomplished by an OR gate.

The SCC I/O module register 105 also has a Detect AB Register. This register consists of Detect A and Detect B 1-bit register which indicate whether the LTPC module 120 has detected the Abort sequence for the corresponding transmit channel. Each register is cleared on reset and is set when the LTPC module 120 has been armed by setting the Start Register and has then detected the Abort sequence. It stays set until the corresponding Start Register is cleared by software.

Using the LTPC module, a LocalTalk packet might be sent proceeding as follows. First, the system processor disables interrupts, and programs the SCC 90 to flag idle. Then It ensures that the Start Register for the channel is cleared so that an RTS_ signal will not be forced high. The system processor then turns on an RTS_ bit in the SCC 90 to enable the line driver 92 and then waits for greater than 1 bit interval to guarantee that an edge is generated on the line. The system processor then turns the RTS_ bit in the SCC 90 off and waits more than one bit interval (say 1.5 or 2 bit intervals) to generate a missing clock. If a synchronization field needs to be generated, the system processor must then put the SCC 90 in a non-FM-0 mode, time the intervals, and then put the SCC 90 back into the FM-0 mode. It then enables the transmitter and turns on the RTS_ bit in the SCC 90, programs the SCC 90 to mark idle, and starts the DMA transmit channel program. It also sets the Start register in the SCC I/O module 100 which causes the LTPC module 120 to start monitoring the transmit line for the Abort sequence. RTS_ will remain in pass-through mode until the Abort sequence has finished.

At this point, the system processor may re-enable interrupts, and it need only poll the Detect register to determine when the Abort sequence has finished. When the LTPC module 120 has detected the Abort sequence, it will automatically drive the RTS_ line high terminating the Abort sequence. The system processor may then turn off the RTS_ bit in the SCC 90, reset the missing clocks flag, and clear the Start register in the SCC I/0 module 100 so that RTS_ will be passed through without any modification.

Thus, the LTPC module 120 at least permits the DMA controller to control the data phase of the packet transfer. There still remains a need, however, to provide an arrangement in which the DMA controller can control even more aspects of local area communications including the preambulatory operations so that the processor can be freed to perform other operations. It is also desirable to accomplish this with a standard SCC, that is, without resorting to complicating modifications of the SCC.

SUMMARY

An object of the present invention is to achieve a system in which a simple list of DMA commands (descriptor list) can be used to control most if not all aspects of packet transmission.

This is accomplished in the present invention through provision of an apparatus for transferring data having a predefined leading sequence, the apparatus comprising a direct access memory controller including a status register, the direct access memory controller performing direct memory access operations at least partially on the basis of a value of at least one status bit in the status register, and a counter which counts down from a countdown value loaded by the direct memory access controller and sets the at least one status bit in the status register when the counter has counted down from the loaded value. The direct memory access controller waits to execute a next instruction until the counter counts down from the countdown value and sets the at least one status bit in the status register controller. The counter is preferably a register.

The predefined leading sequence, for example, may include a first pulse of a first predetermined duration. The direct memory access controller may produce the first pulse by enabling a transmit line driver, loading a countdown value corresponding to the first predetermined duration into the counter register, putting a first value on an output line connected to the transmit line driver, and then waiting until the counter sets the at least one status bit in the channel status register when the counter has counted down to zero.

The arrangement may also include at least one register programmed by the direct memory access controller with a value which controls generation of an enable signal and a transmit line driver having an enable input connected to receive the enable signal.

The data may also have a predefined trailing sequence. If so, the apparatus may further comprise a module for detecting the predefined trailing sequence and disabling the transmit line driver in response to detecting the predefined trailing sequence. The module is preferably programmed by the direct memory access controller.

The apparatus may also include at least one register programmed by the direct memory access controller with a value which controls generation of an enable signal a transmit line driver having an enable input connected to receive the enable signal. The arrangement may also have a logic gate which forms a logic product of a first input signal and a second input signal and wherein the module suppresses enablement of the transmit line driver by generating a signal which is one input to the logic gate and the control signal is supplied as the second input and an output of the logic gate is applied to the enable input of the transmit line driver.

A method of controlling a data transfer according to the invention comprises a step (a) performed by a direct access memory controller of loading a countdown value into a counter, a step (b) performed by the counter of counting down from the countdown value loaded by the direct memory access controller, a step (c) performed by the direct memory access controller of asserting a first value on an output line while the counter counts down from the countdown value, a step (d) performed by the counter of setting a status bit in a status register of the direct memory access controller when the counter has counted down from the countdown value, and a step (e) performed by the direct memory access controller of ceasing to assert the first value on the output line when the counter sets the status bit.

The method may have an additional step performed by the direct memory access controller before the step (b) of programming at least one register with a value which controls generation of an enable signal.

When the data has a predefined trailing sequence, the method may comprise a step after the step (e) and performed by a module of detecting the predefined trailing sequence and disabling a transmit line driver in response to detecting the predefined trailing sequence.

The invention also resides in a method of generating a first pulse of a predefined leading sequence for data to be transmitted, the method comprising the steps performed by a direct memory access controller of enabling a transmit line driver, loading a starting value into a counter register, putting a first value on an output line, and waiting until the counter register sets at least one status bit in a channel status register in the direct memory access controller when the counter has counted down to zero.

DESCRIPTION OF THE DRAWINGS

FIG. 5(a) shows the layout of a channel control register; FIG. 5(b) shows the layout of a channel status register.

FIG. 6 shows the general format for a DMA channel command.

FIG. 7 shows the format for a STORE_QUAD command.

DETAILED DESCRIPTION

Figure 1:
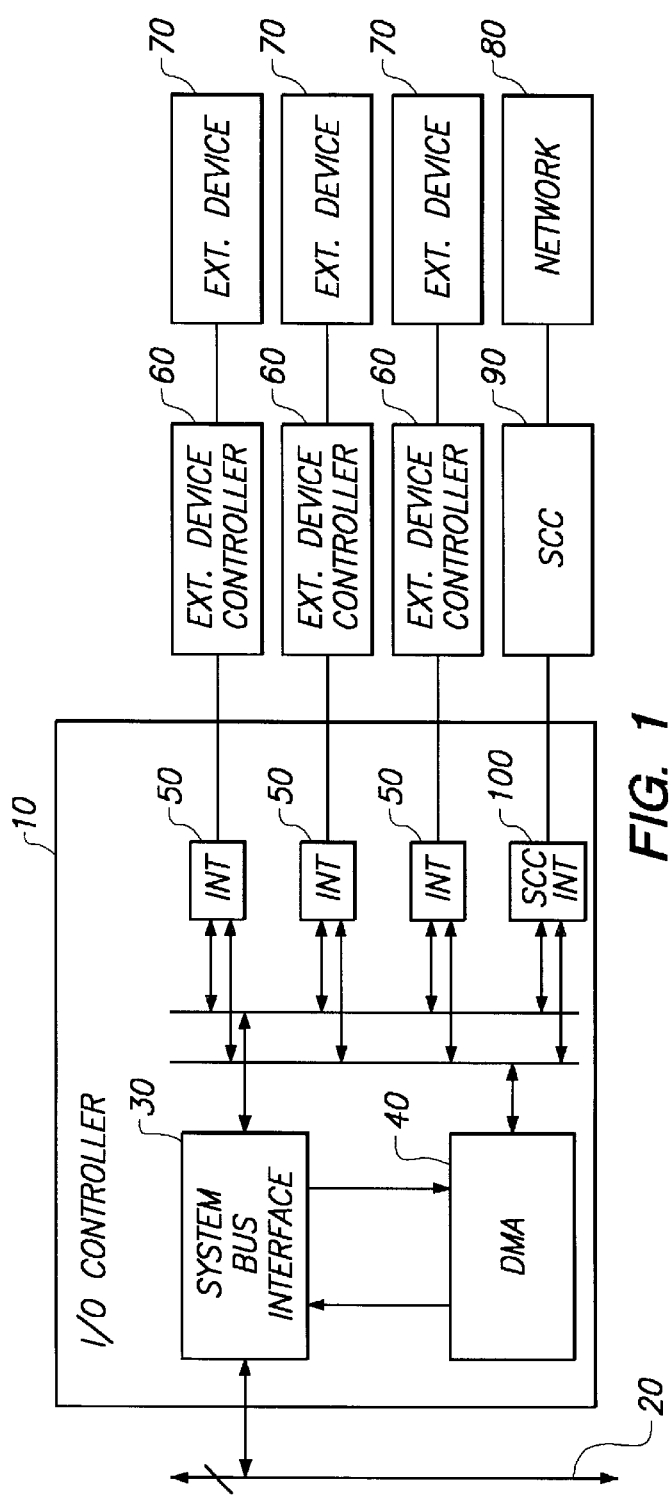
FIG. 1 is a functional block diagram of a computer system connected to a number of external devices.
Figures 3, 4:
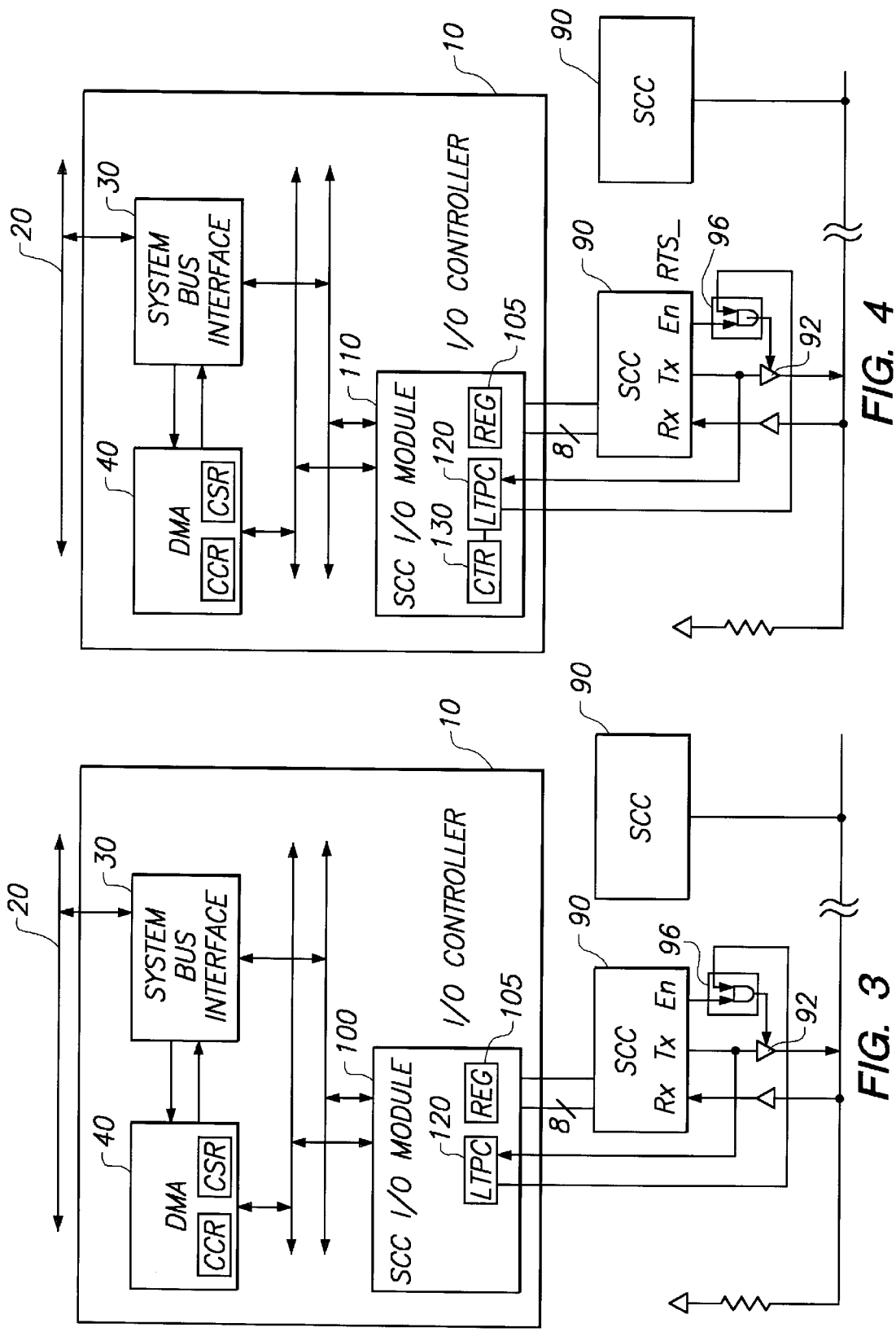
FIG. 3 is a functional block diagram of an arrangement including an I/O controller and a serial communications controller.
FIG. 4 is a functional block diagram of a first preferred embodiment of the present invention.

A system according to a presently preferred embodiment of the invention is shown in FIG. 4. The system of FIG. 4 may include additional components, but only components the illustration of which is essential to an understanding of the invention are shown. Also, components similar to those shown in FIGS. 1 and 3 have the same reference numeral.

The arrangement of FIG. 4 includes a DMA controller 40. A DMA controller of the type which it is presently preferred to use is more completely described in U.S. patent applications Ser. Nos. 08/340,248 and 08/340,249, both of which are incorporated herein by reference.

It is desired that the arrangement of FIG. 4 be capable of generating various network timing signals autonomously of the system processor. To achieve this end, the SCC I/O module includes a counter 130. The operations of this device will be explained in more detail below.

The DMA controller 40 controls a group of DMA channels, each assigned to a particular device. The SCC 110 preferably has four such DMA channels assigned to it, one transmit channel and one receive channel for each of its two channels, channel A and channel B. Each channel in turn has several registers associated with it. These and other registers are shown in connection with the device with which they are logically associated. This is for the sake of a simplified description only, and it will be understood by one of ordinary skill in the art that these registers are preferably mapped onto a portion of the processor's address space. Two such registers are a read/write channel control register (FIG. 5(a)) and a read only channel status register (FIG. 5(b)). The lowest eight bits [s7 . . . s0] of each of these registers make up a set of eight general purpose status bits which are written through the channel control register and read through the channel status register. These status bits can be used for general purpose status and control. Their meaning may be channel specific, and they can be controlled either by hardware or software. They may effect conditional interrupt, branch, and wait conditions.

More particularly, in implementation of the SCC transmit channels, it is desirable to set and clear selected ones of the general purpose status bits directly through hardwired connections. The bits can be then tested at the end of a channel command to determine what action (e.g., interrupt, branch, or wait) should be taken. For example, in a presently preferred embodiment, as explained below, one of the bits (s7) indicates when the counter 130 has counted down to zero, and another (s5) is set when the LTPC module 120 detects the end of a LocalTalk packet.

The DMA channel registers also include a wait select condition register which may be used to generate a wait condition bit which is tested at the completion of a command to determine if command execution should be suspended.

The general format for a DMA channel command is shown in FIG. 6. It contains 16 bits of op code fields including a 4-bit command field (cmd) and 2 bit interrupt (i), branch (b), and wait (w) fields. It also includes a 16-bit request count field (reqCount), a 32-bit address parameter (address), and a 32-bit command dependent parameter field (cmdDep). The transfer status (xferStatus) and the residual count (resCount) fields are used by the channel to report status after a command has been carried out. Although the location and size of the command dependent parameter field cmDep is standardized for all commands, its interpretation is dependent on the command field value.

The command field cmd specifies which type of data transfer is to be performed. Two types of possible data transfers are STORE_QUAD (store an immediate four-byte value) and LOAD_QUAD (load an immediate four-byte value).

The w field optionally suspends further command fetching in conjunction with an internal wait condition bit generated by the channel interface. The channel interface generates the wait condition based on the current values of the channel status bits along with a mask and a data value found in a wait select register for each channel.

The value in the w field can be 0, 1, 2, or 3. These can be used respectively to specify whether the channel should never wait, wait if the condition bit is true, wait if the condition bit is false, or always wait. If it is determined that a channel should wait before continuing its operation, the wait occurs after the data transfer completes, but before status is written back and an interrupt is generated.

As noted, two types of possible data transfers are STORE_QUAD and LOAD_QUAD. The format for a STORE_QUAD command is shown in FIG. 7. The STORE_QUAD command stores a 32-bit immediate value into system memory space. The 32-bit "data32" field specifies the data value while the address field specifies the destination address. The LOAD_QUAD command loads a 32-bit immediate value from memory.

Accesses to SCC commands/status registers require a two-step process. First, the address of the register must be written to the appropriate command register. Then, a data read/write operation must be performed to the command register. Transmit/receive data accesses require only one read or write operation. However, these will normally be done via DMA.

As mentioned, in a presently preferred embodiment, the SCC I/O module 100 has two transmit channels, an A transmit channel and a B transmit channel. Each channel has a timer in the form of a counter 130 connected to the DMA status bits for accurately timing delays on the associated serial port. Each counter 130 is configured as a 32 bit register with bits 16 and 7 through 0 implemented. Bit 16 is a timer clock select bit. When this bit is set, the counter 130 is decremented on the rising edge of the external clock input to the SCC I/O module 100. When the bit is clear, the counter is decremented on the rising edge of a 921.6 Khz clock, giving approximately 1 microsecond (1.085 microsecond) resolution on the counter.

Bits [7:0] are the counter value. These bits are read/write and are written to a nonzero value to start the counter 130. When the counter 130 goes to zero, it sets the bit s7 in the transmit DMA status register for the channel. When the bit s7 is clear, the counter is running. The end-of-packet detection provided by the LTPC module 120 is also connected to the DMA status bits to set bit s5.

More particularly, for the case of the B transmit channel, there is a StartB register. This register is a byte wide with only bit 0 implemented. When this bit is set, the LTPC module 120 takes control of the RTS_ (i.e., enable) line to the serial port B transmitting line driver 92 and begins looking for the mark bits (e.g., 1's) at the end of a LocalTalk packet. After a predetermined number of mark bits (e.g., more than 15), the LTPC module will disable or "tristate" the serial port B transmitting line driver 92 and set the corresponding S-bit (bit s5) in the SCC B Channel Status register. It also sets the LTPC Detect AB register in the SCC I/O module 100.

Figure 2:
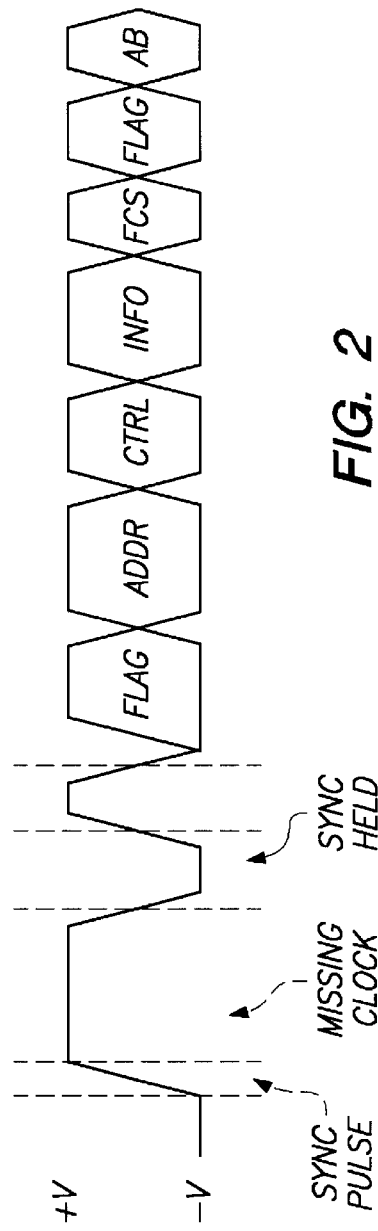
FIG. 2 is a timing diagram showing structured data to be transmitted with predefined leading and trailing sequences.
Figure 8:
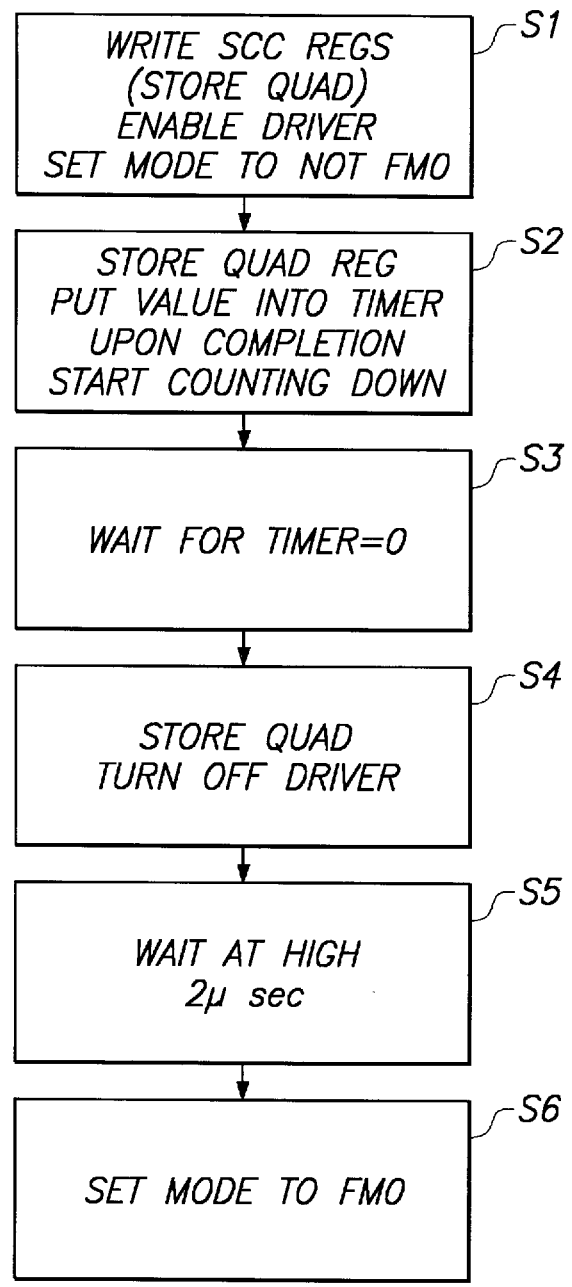
FIG. 8 is a flowchart showing a preferred method of generating a predefined leading sequence.

The implementation of the counter 130 makes it possible for the DMA controller 40 to handle at least part of the leading sequence signal generation for transmission of a packet. More particularly, in a presently preferred embodiment of the invention, the counter 130 may be used to generate the sync field as shown in FIG. 2. A method for accomplishing this is illustrated in FIG. 8. First, in step S1, DMA executes a series of STORE_QUAD commands to program registers in the SCC I/O module 100 to enable the line driver (set RTS_ and the output of the LTPC module 120), and sets the mode for the SCC 90 to not FM-0 so that the encoding does not produce spurious transitions. In step S2, DMA executes another STORE_QUAD command to load a starting value into the counter "timer" register which will cause it to count down for about 3 $\mu$sec and set the clock select bit. DMA then puts a low value on the output line and then in step S3 executes a "wait" instruction which causes DMA to wait until bit s7 of the channel status register is set, that is, until the counter register has counted down to zero, at which time the status bit s7 will be set in the channel status register and instruction execution may continue. This creates the low 3 $\mu$sec front end of the sync field.

In step S4 the DMA controller executes another STORE_QUAD command to turn off the driver 92 which causes the line to go high. Step S5 is another wait step, in which DMA executes another STORE_QUAD command to load a starting value into the counter "timer" register which will cause it to count down for about 2 $\mu$sec and set the clock select bit and reset the s7 status bit. DMA then waits until bit s7 of the channel status register is set, that is, until the counter register has counted down to zero, at which time the status bit s7 will be set in the channel status register and instruction execution may continue. This creates the high 2 $\mu$sec part of the front end of the sync field. The DMA controller then sets the transmission mode of the SCC 90 back to FM-0 so that transmission of the data frame (FIG. 2) can commence.

This, with the provision of a counter or timer register in the SCC I/O module 110, coupled with a DMA controller capable of responding to status information to execute a wait instruction, the task of creating the sync field can be accomplished without system processor intervention and with a standard SCC module. This, coupled with the provision of the LTPC module 120 and associated registers makes it possible for the DMA controller 40 to control packet transmission from the start of the sync field through the detection of the Abort sequence and disabling of the transmission line driver, i.e., through to the end of packet transmission.

The present invention has been described herein in terms of specific embodiments for the purposes of elucidating the principles of the invention only. It will be apparent to one having ordinary skill in the art, however, that the invention can be embodied in other forms without departing from its principles. The examples should therefore be regarded as illustrative rather than limiting. The invention should not be regarded as being limited to these specific embodiments, but instead as being fully commensurate in scope with the following claims.

What is claimed is:

1. Apparatus for transferring data having a predefined leading sequence, said apparatus comprising:

a direct access memory controller including a status register, the direct access memory controller performing direct memory access operations at least partially on the basis of a value of at least one status bit in said status register; and a counter which counts down from a countdown value loaded by said direct memory access controller and sets said at least one status bit in said status register when said counter has counted down from said loaded value, wherein said direct memory access controller waits to execute a next instruction until said counter counts down from said countdown value and sets said at least one status bit in said status register controller.

2. Apparatus as claimed in claim 1 wherein said counter is a register.

3. Apparatus as claimed in claim 1 wherein said predefined leading sequence includes a first pulse of a first predetermined duration, and wherein said direct memory access controller produces said first pulse by enabling a transmit line driver, loading a countdown value corresponding to said first predetermined duration into the counter register, putting a first value on an output line connected to said transmit line driver, and then waiting until the counter sets said at least one status bit in said channel status register when said counter has counted down to zero.

4. Apparatus as claimed in claim 1 further comprising
   at least one register programmed by said direct memory access controller with a value which controls generation of an enable signal; and
   a transmit line driver having an enable input connected to receive said enable signal.

5. Apparatus as claimed in claim 4 wherein said direct memory access controller produces said first pulse by enabling said transmit line driver, loading a starting value into the counter register, putting a first value on an output line connected to said transmit line driver, and then waiting until the counter sets said at least one status bit in said channel status register when said counter has counted down to zero.

6. Apparatus as claimed in claim 1 wherein said data additionally has a predefined trailing sequence, and wherein said apparatus further comprises a module for detecting the predefined trailing sequence and disabling said transmit line driver in response to detecting said predefined trailing sequence.

7. Apparatus as claimed in claim 6 wherein said module is programmed by said direct memory access controller.

8. Apparatus as claimed in claim 6 wherein said predefined trailing sequence is an abort sequence, and wherein said module for detecting the predefined trailing sequence is programmed by said direct memory access controller to set a status bit in said channel status register in response to detecting said predefined trailing sequence.

9. Apparatus as claimed in claim 6 further comprising
   at least one register programmed by said direct memory access controller with a value which controls generation of an enable signal; and
   a transmit line driver having an enable input connected to receive said enable signal.

10. Apparatus as claimed in claim 9 further comprising a logic gate which forms a logic product of a first input signal and a second input signal and wherein said module suppresses enablement of said transmit line driver by generating a signal which is one input to said logic gate and said control signal is supplied as said second input and an output of said logic gate is applied to said enable input of said transmit line driver.

11. A method of controlling a data transfer, said method comprising the steps of:
   a step (a) performed by a direct access memory controller of loading a countdown value into a counter;
   a step (b) performed by said counter of counting down from said countdown value loaded by said direct memory access controller;
   a step (c) performed by said direct memory access controller of asserting a first value on an output line while said counter counts down from said countdown value;
   a step (d) performed by said counter of setting a status bit in a status register of said direct memory access controller when said counter has counted down from said countdown value; and
   a step (e) performed by said direct memory access controller of ceasing to assert said first value on said output line when said counter sets said status bit.

12. A method as claimed in claim 11 further comprising a step performed by said direct memory access controller before said step (b) of programming at least one register with a value which controls generation of an enable signal.

13. A method as claimed in claim 11 wherein said data has a predefined trailing sequence and further comprising a step after said step (e) and performed by a module of detecting the predefined trailing sequence and disabling a transmit line driver in response to detecting said predefined trailing sequence.

14. A method as claimed in claim 13 wherein said predefined trailing sequence is an abort sequence, and wherein said module sets a status bit in said channel status register in response to detecting said predefined trailing sequence.

15. A method of generating a first pulse of a predefined leading sequence for data to be transmitted, said method comprising the steps performed by a direct memory access controller of:
   enabling a transmit line driver;
   loading a starting value into a counter register;
   putting a first value on an output line; and
   waiting until the counter register sets at least one status bit in a channel status register in said direct memory access controller when said counter has counted down to zero.

* * * * *